May 6, 1941.  B. DICK  2,241,188
AUXILIARY FLUID SUPPLY MEANS FOR FLUID BRAKES
Filed Feb. 23, 1939  2 Sheets-Sheet 2

INVENTOR
BURNS DICK
BY
ATTORNEY

Patented May 6, 1941

2,241,188

UNITED STATES PATENT OFFICE 2,241,188

AUXILIARY FLUID SUPPLY MEANS FOR FLUID BRAKES

Burns Dick, Ferguson, Mo., assignor to Wagner Electric Corporation, St. Louis, Mo., a corporation of Delaware Application February 23, 1939, Serial No. 257,931

9 Claims. (Cl. 60—54.6)

My invention relates to fluid-actuated brakes and more particularly to means for insuring that sufficient fluid will be available for proper operation of the brakes.

One of the objects of my invention is to provide an auxiliary fluid supply for association with the master cylinder of a fluid-actuated braking apparatus.

Another object of my invention is to provide means whereby the container in which braking fluid is marketed can be employed as an auxiliary fluid reservoir for the master cylinder of the braking system.

Still another object of my invention is to provide a holder for a container of brake fluid as sold on the market which will permit the container to be used as an auxiliary reservoir and to be conveniently and quickly placed in communication with the master cylinder so that the fluid can be properly dispensed and to also permit replacement by a full container when the fluid has been used.

Figure 1:
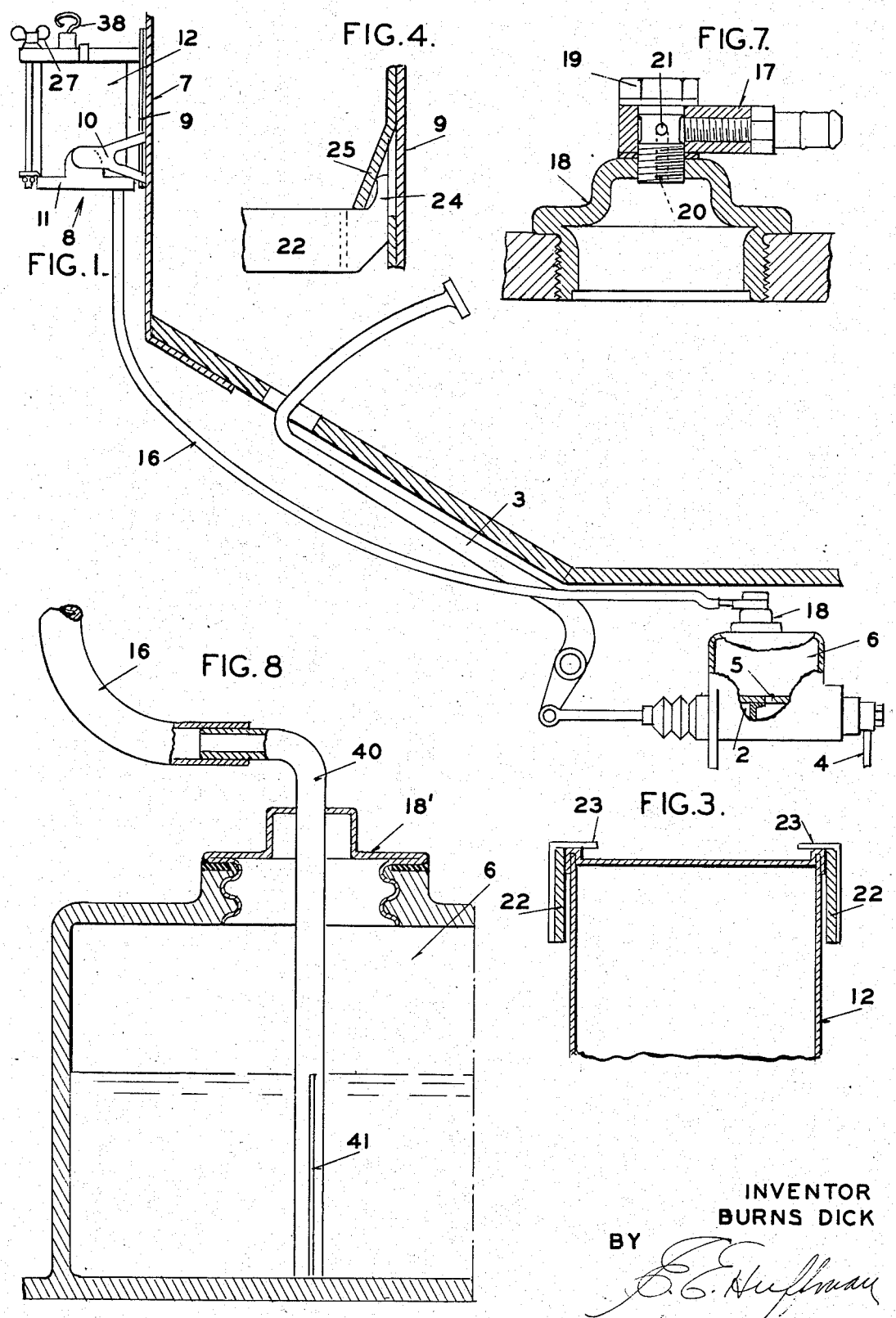
Figure 2:
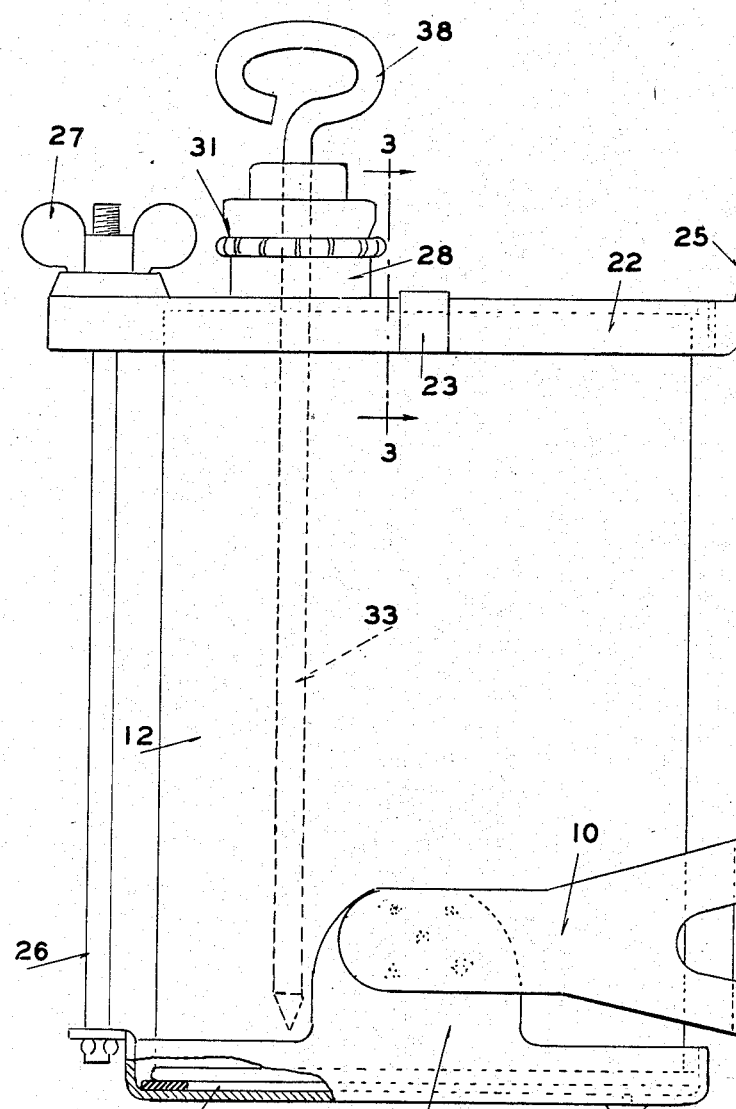
Figure 5:
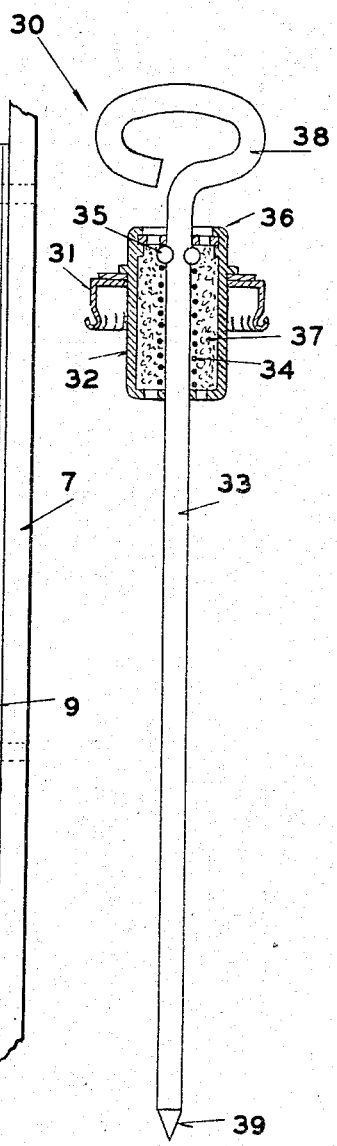
Figure 6:
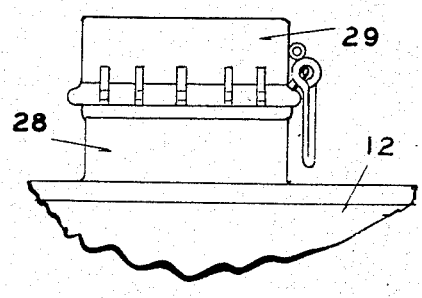

Other objects of my invention will become apparent from the following description taken in connection with the accompanying drawings in which Figure 1 is a view showing my auxiliary fluid supply means associated with a master cylinder of a fluid braking system; Figure 2 is an enlarged side view of the holder for the container, parts being shown in section; Figure 3 is a cross-sectional view taken on the line 3—3 of Figure 2; Figure 4 is an enlarged cross-sectional view showing how the removable top is associated with the holder; Figure 5 is a cross-sectional view of the combined cap and punch rod; Figure 6 is a view of the top of the container as sold on the market; Figure 7 is a cross-sectional view showing the master cylinder reservoir plug and the manner in which the conduit is connected thereto; and Figure 8 is a view of a modified construction for connecting the conduit to the master cylinder reservoir.

Referring to the drawings in detail, numeral 1 indicates the usual master cylinder of a hydraulic brake actuating system, the piston 2 of which is operated by the pedal 3 to apply pressure to the braking units (not shown) connected with the conduit 4. When the piston is in its normal retracted position, as shown, it uncovers a porthole 5 whereby the reservoir 6 is placed in communication with the system and thus permit contraction and expansion of the fluid and also maintain the system filled with the required amount of fluid. The master cylinder is sometimes positioned in a remote place and because of this, the reserve supply of fluid in the reservoir is not checked at proper intervals and it may happen that the reservoir may become empty without the operator being aware of it.

In accordance with my invention, I have provided a reserve fluid supply for association with the master cylinder reservoir whereby a container of fluid as merchandised through the trade outlets can be employed as the reserve reservoir without transferring the fluid therefrom. By my invention I have also provided means whereby the reserve fluid can be conveniently associated with the master cylinder reservoir and also easily checked to ascertain if the container is empty and should be replaced by a full container.

Above the master cylinder on some convenient support, as for example, the dashboard 7, I mount a holder 8 shown in detail in Figure 2. This holder comprises an attaching member 9 having spaced forwardly extending arms 10 to which is secured, as by welding, a shallow cup-shaped supporting member 11 of such shape as to receive the bottom portion of a container or tin can 12 in which brake fluid is marketed. In the bottom of this cup-shaped member 11 is positioned a ring-like gasket 13 of rubber or other suitable material upon which the bottom edge of the container 12 is positioned when mounted on the holder. The gasket is of such thickness that a space will be present within the confines of the gasket and between the bottom of the can and the member 11. This space communicates with an outlet passage 14 in the bottom of the member 11. A fitting 15 is associated with the outlet passage for connecting it to a conduit 16 leading to the reservoir 6 of the master cylinder. The conduit is shown as a rubber hose but may be made of any other suitable material such as copper.

As shown in detail in Figure 7, the lower end of the conduit has secured thereto a fitting 17 which is connected to the top of the closure plug 18 of the master cylinder reservoir by a bolt 19 having a longitudinal passage 20 and a cross passage 21 for permitting fluid to flow from the conduit to the reservoir.

The container or can 12 in which the fluid is sold is held in the holder with its bottom edge sealed against the gasket 13 by means of a top member 22 which is provided with ears 23 for engaging the central side portions of the top of the can. One end of the top is provided with a hook-like projection 24 which engages under an abutment 25 struck out of the attaching member 9 (Figure 4). The top is pressed down on the can to force the bottom thereof against the gasket by means of a bolt 26 and wing nut 27.

The container or can 12, as sold on the market, is provided with a pouring spout 28 which is closed by a special sealing cap 29 of known construction. When it is desired to employ the can as a reserve reservoir, the cap 29 is removed and a special combined cap and rod 30 (shown in Figure 5) is associated with the spout and can. The special cap 31 is adapted to fit on the spout and is provided with a tubular part 32 through which extends a rod 33. A spring 34 is interposed between the lower end of the tubular part and a shoulder 35 on the rod for maintaining the shoulder biased against a flange 36 on the upper end of the tubular part. Suitable filter material 37 is placed on the tubular part around the rod to keep out foreign matter. The exterior end of the rod is provided with a gripping portion 38 and the lower end is formed as a punch by being provided with a sharp end 39. The length of the rod is such that when the cap 31 is placed on the spout, the pointed end of the rod will extend to a point closely adjacent the bottom of the can 12, as shown in Figure 2.

In operation when it is desired to employ the auxiliary fluid supply means, a full container of fluid as merchanised is placed in the holder. This container is at present made of tin and the size contemplated to be employed is of one-pint capacity. The original cap 29 is removed and the combined cap and rod placed in position, the cap 31 fitting on the spout and being held in place by its resilient fingers. The container is set in the cup-shaped supporting member 11 and forced thereon by the top member when the wing nut is screwed down. The top member engages the top of the can only by the ears 23 which cooperate with the center of the can, thus causing the bottom of the can to be forced with a uniform pressure into the gasket without tilting and sealed to the cup-shaped supporting member. To place the interior of the container in communication with the conduit, the top of the rod is pushed downward, thereby causing the sharp end to puncture the bottom of the container and allow the fluid to flow into the conduit. The spring 34 retracts the rod. When the fluid in the container is used up, the empty container is removed and a new one substituted therefor in the manner described.

It is to be noted that the combined rod 33 and cap 31 are easily removable, thus permitting the rod to also serve as a dip stick to ascertain the quantity of fluid in the container. The container is conveniently placed so that it is possible to check the brake fluid each time the engine of the vehicle is serviced, thus insuring that the vehicle operator will be appraised whether or not his brakes have a proper reserve supply of fluid. The holder for the container permits the container to be easily and quickly mounted thereon, thus enabling unskilled persons to change an empty container for a full one.

Under certain conditions it may not be desirable to seal the lower end of the conduit 16 to the plug of the master cylinder reservoir. In the construction shown in Figure 8, the plug 18' is provided with a central hole through which projects a pipe 40 extending to the bottom of the reservoir 6. The outer end of the pipe is connected to the conduit 16. The pipe within the reservoir has a slot 41 which extends from the end of the pipe to a point where it is desired to maintain the level of the fluid in the reservoir.

This construction is particularly useful where it is desired to employ a sealed container 12 after it has had its bottom punctured. This can be done by removing the combined cap and rod and replacing the original cap 29. With the can sealed, air can enter it only through the conduit to thus permit the fluid to run out. Air is permitted to pass through the conduit only when the fluid level in the reservoir goes below the top end of the slot 41. When sufficient fluid flows into the reservoir to again be above the end of the slot, the conduit will be sealed and no more air can enter the can.

Being aware of the possibility of other modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In means for establishing a reserve supply of fluid for a fluid pressure apparatus, a marketable container of fluid provided with a pouring spout, a conduit connected at one end with the fluid pressure apparatus, detachable means for sealing the other end of the conduit to the bottom of the container, and means comprising a pointed rod carried by the spout and extending through the opening therein into the container and adapted to be operated to puncture the bottom of the container and place the interior thereof in communication with the conduit.

2. In means for establishing a reserve supply of fluid for a fluid pressure apparatus, a marketable container of fluid provided with a pouring spout, a conduit connected at one end with the fluid pressure apparatus, detachable means for sealing the other end of the conduit to the bottom of the container, and means comprising a punch mounted on the spout and extending into the container for puncturing the bottom of the container and placing the interior thereof in communication with the conduit.

3. In means for establishing a reserve supply of fluid for a fluid pressure apparatus, a marketable container of fluid provided with a pouring spout, a conduit connected at one end with the fluid pressure apparatus, detachable means for sealing the other end of the conduit to the bottom of the container, a detachable cap for the spout, a rod carried by the cap and having a pointed end adapted to be positioned adjacent the interior of the bottom of the container when the cap is mounted on the spout, and means permitting said rod to be moved longitudinally with respect to the cap to thereby cause the bottom of the container to be punctured and the interior of the container placed in communication with the conduit.

4. In means for establishing a reserve supply of fluid for a fluid pressure apparatus, a marketable container of fluid provided with a pouring spout, a conduit connected at one end with the fluid pressure apparatus, detachable means for sealing the other end of the conduit to the bottom of the container, a detachable cap for the spout, a rod carried by the cap and having a pointed end adapted to be positioned adjacent the interior of the bottom of the container when the cap is mounted on the spout, said rod being capable of longitudinal movement with respect to the cap and having a pointed end whereby the bottom of the can may be punctured by a longitudinal movement of said rod, and a spring associated with the rod and cap for biasing the rod to a position where the pointed end of the rod will be spaced from the bottom of the can.

5. In apparatus of the class described, a holder provided with a bottom, a ring-like sealing gasket associated with the bottom, a metal can of fluid provided with a pouring spout and mounted in the holder with its bottom edge engaging the gasket, means for forcing the bottom edge of the can into sealing engagement with the gasket, a conduit secured to the bottom of the holder and in communication with the space surrounded by the gasket, and a rod adapted to be mounted on the can and to extend through the pouring spout and into the can to a point adjacent the bottom thereof, said rod being provided with a pointed end for puncturing the bottom of the can.

6. In apparatus of the class described, a holder provided with a bottom, a ring-like sealing gasket associated with the bottom, a metal can of fluid provided with a pouring spout and mounted in the holder with its bottom edge engaging the gasket, means for forcing the bottom edge of the can into sealing engagement with the gasket, a conduit secured to the bottom of the holder and in communication with the space surrounded by the gasket, a cap for the spout, a rod carried by the cap and extending into the can to a point adjacent the bottom thereof when the cap is in position, said rod being capable of longitudinal movement with respect to the cap and having a pointed end whereby the bottom of the can may be punctured by a longitudinal movement of said rod, and a spring associated with the rod and cap for biasing the rod to a position where the pointed end of the rod will be spaced from the bottom of the can.

7. In a fluid braking system, a master cylinder provided with a fluid reservoir having a threaded opening in its top, the combination therewith of a plug for said reservoir opening, a tube carried by said plug and extending into the reservoir to the bottom of the reservoir, said tube being provided with an opening spaced from the lower end thereof, a conduit connected to the tube, a holder positioned above the reservoir, a container of fluid mounted in the holder, and means for placing the conduit in communication with the interior of the container.

8. In means permitting a container of fluid as sold on the market to be employed as a reserve supply chamber of fluid for a fluid system and wherein said container is provided with a pouring spout and a removable closure cap therefor, said means comprising a support upon which the bottom of the container of fluid is positioned, a conduit for conducting fluid from the container, means for sealing the conduit to the bottom wall of the container, a substitute cap for mounting on the spout in place of the original cap, and a punch so carried by said substitute cap that it will extend into the container to such a point when the cap is placed on the spout that the wall of the container can be punctured by movement of said punch and thus place the container in communication with the conduit.

9. In apparatus of the class described, a container for fluid having a pouring spout on its top, a flat bottom and a rolled sealed edge projecting below the bottom, a holder for the container comprising a cup-shaped supporting member, a ring-like sealing gasket positioned in the bottom of said supporting member, said supporting member being of a size and shape to have positioned thereon the container with the bottom edge only of said container engaging the gasket to thus provide a space between the supporting member and substantially the entire bottom of the container, a top member for co-operatively engaging the top of the container, means associated with the supporting member and the top member for causing the top member to force the bottom edge of the container into sealing engagement with the gasket, a conduit secured to the supporting member and communicating with the space surrounded by the gasket, and means comprising a punch carried by the pouring spout and extending into the interior of the container and to a point adjacent the bottom thereof for puncturing the bottom when forced downwardly.

BURNS DICK.